UNITED STATES PATENT OFFICE.

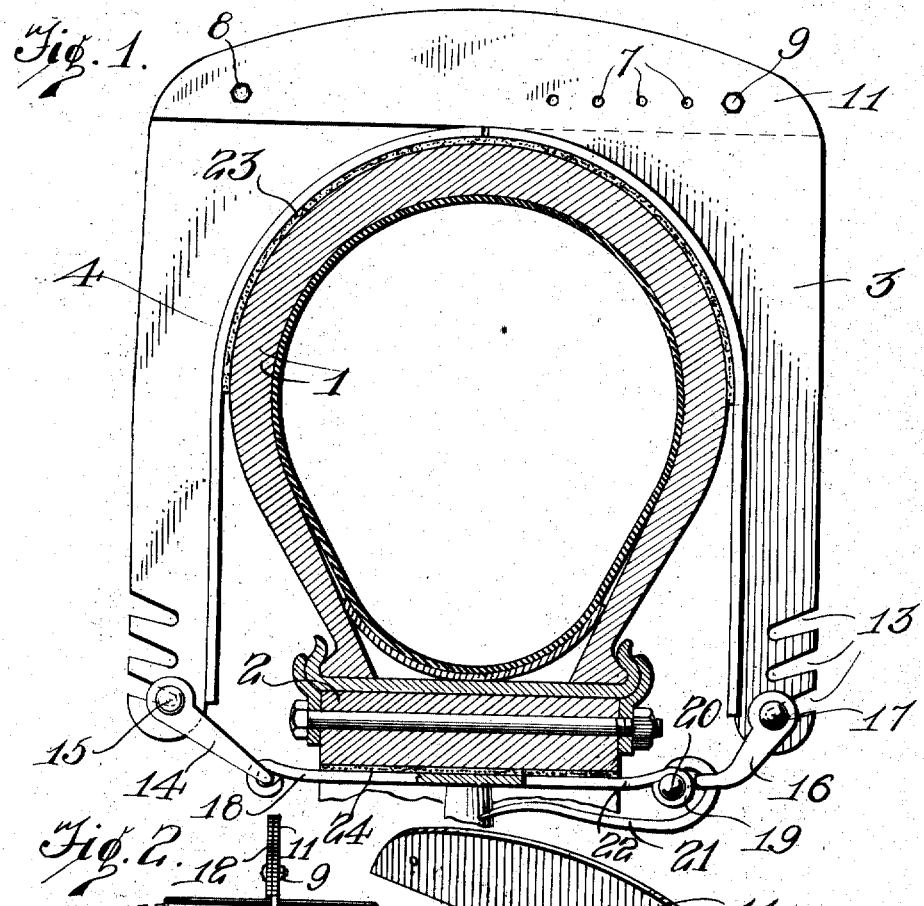
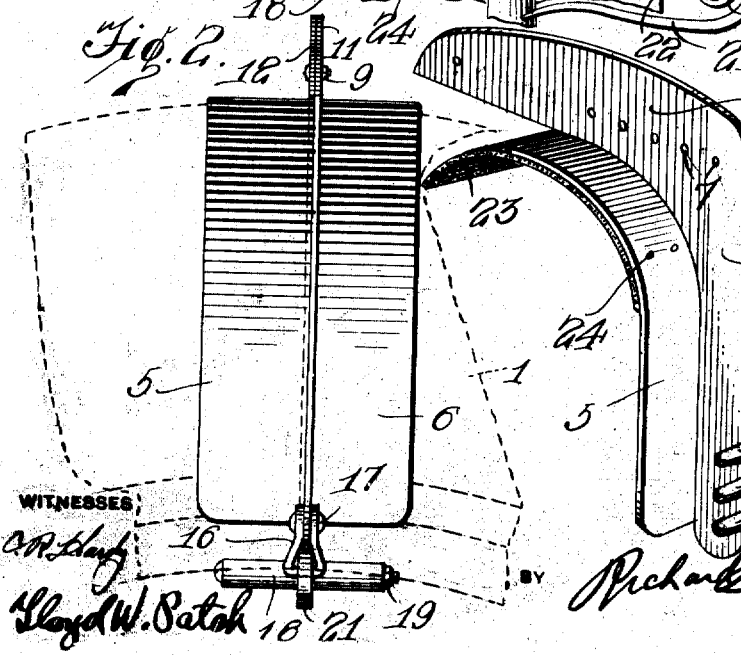
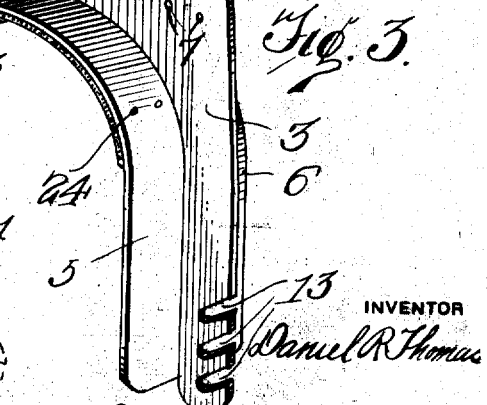

DANIEL R. THOMAS, OF OKLAHOMA, OKLAHOMA.

TIRE-SHOE.

1,254,089.  Specification of Letters Patent.  Patented Jan. 22, 1918.

Application filed October 27, 1915.  Serial No. 58,124.

*To all whom it may concern:*

Be it known that I, DANIEL R. THOMAS, a citizen of the United States, residing at Oklahoma, in the county of Oklahoma and State of Oklahoma, have invented certain new and useful Improvements in Tire-Shoes, of which the following is a specification.

An object of my invention is to provide a shoe which may be fitted in place and secured upon a tire to provide a roughening calk, and which may be used as a permanent attachment, or may be fitted in place only in case of emergency to aid the wheel in clearing a mud-hole or in climbing out of a rut.

A further object is to so construct the shoe that the same device made to a standard size may be adjusted for use on tires of various sizes, and to also provide a fastening means which will be capable of adjustment to compensate for the adjustments of the shoe structure proper.

Yet another object is to provide a fastening means which will permit the shoe to be fitted to and removed from the tire with the use of one hand so that the attachment may be fitted in the operative relation or removed while the operator is standing on the running board or step of the automobile or other vehicle to which the tire is fitted.

With these and other objects in view, my invention relates to certain novel features of construction and combinations of parts which will be hereinafter more fully described, pointed out in connection with the accompanying drawings and set forth in the claims.

In the drawings:

Figure 1 is a view taken transversely through a tire and rim with my invention applied thereon.

Fig. 2 is a view in elevation of the attachment.

Fig. 3 is a view in perspective of one of the members making up the shoe.

In the adaptation of the invention as illustrated in Fig. 1, the shoe is shown fitted to a pneumatic tire, and this tire 1 is mounted in place on the rim or felly 2 of the wheel, these parts being of standard form.

The members 3 and 4 of the shoe are substantially duplicates, and are preferably made of malleable iron or some other metal capable of withstanding a considerable shock and strain directly and suddenly imparted thereto. These members 3 and 4, when viewed in side elevation are substantially L-shaped with the inner angle curved gradually from the one arm to the other, and the transverse flanges 5 and 6 are formed to extend substantially at right angles from the members 3 and 4 and on opposite sides at the curved portion and on the inner edge of the longer arm.

The shorter arms of the members 3 and 4 have the openings 7 provided therethrough to be in registry, and these openings are so spaced apart that as the members 3 and 4 may be adjusted to obtain greater width of extension between the side arms thereof the openings will yet register and will permit the fitting of the bolts 8 and 9, or other suitable fastening means which may be employed. When the two members are adjusted and secured in place by the bolts 8 and 9, the laterally extending flanges 5 and 6 constitute a substantially U-shaped tire receiving portion within which the tire 1 may be fitted and the short arms 11 and 12 of the members 3 and 4 which are secured in the adjacent relation form an upstanding rib or calk extending transversely across the tire and continued in the long arms of the members down along the sides of the tire.

A plurality of notches 13 are formed at spaced intervals along the depending ends of the long arms of the members 3 and 4, which notches are preferably slightly inclined downwardly from the outer edge, and also slightly flared at their open ends. A hinge yoke 14 has the pin 15 secured across the open ends thereof, and by fitting this pin 15 in one of the openings 13, the yoke will depend with the looped portion thereof disposed inwardly. A stirrup member 16 has a pin 17 disposed across the ends thereof to be received in the inclined notches 13 of the remaining shoe member and this stirrup member 16 also has the loop disposed inwardly. A strap member 18 is hingedly connected with the yoke member 14 and is capable of free swinging movement thereon, and at the opposite end of this strap member 18 the loops 19 are provided to receive the pivot pin 20. A volute shaped catch or buckle member 21 is mounted on this pivot pin 20 to be capable of swinging movement, the strap 18 being bifurcated at the end 22 to accommodate the width of the member 21 and to permit the same to be swung to the extended position.

In the use of the shoe, the bolts 8 and 9 are adjusted through the proper openings to bring the laterally extending flanges 5 and 6 to fit and bear against the tire, the yoke member 14 is then adjusted to the proper position by the positioning of the pin 15 within one of the notches 13 of the member 4, the pin 17 of the stirrup member 16 is adjusted to a corresponding notch on the member 3, and the strap member 18 is swung up against the inner side of the rim or felly 2 after which the catch 21 is fitted through the loop of the stirrup 16 and is swung to the position illustrated in Fig. 1 where it holds the strap 18 in bearing engagement with the felly and in consequence secures the members 3 and 4 in a rigid mounting on the tire with the short arms 11 and 12 of these members in their overlapped relation forming an outstanding calk which is continued in the long arms of the members in proximity to the sides of the tire.

Due to the fact that the yoke member 14, the strap member 18, and the stirrup member 16 will at all times present substantially the same length and are not made extensible, when the members 3 and 4 are adjusted to accommodate tires of greater or lesser width, it will be necessary to adjust the pins 15 and 17 of the yoke and stirrup members to be received and held in those notches 13 where the proper bearing of the strap against the inner side of the felly will be accomplished. In the present disclosure, the pins 15 and 17 are illustrated as being fitted in the outermost notches 13 however, this is only due to the fact that the tire structure as illustrated is shown as being of more than usual height, and it will of course be understood that ordinarily where the members 3 and 4 are adjusted for a comparatively small size tire such as shown in Fig. 1 of the drawing, the pins 15 and 17 would be adjusted to the innermost notches 13.

It is preferable that a leather or other cushion strip 23 be secured by the rivets 24 on the inside of the curved portion of the flanges 5 and 6 of one of the members to have its free ends project therefrom in a position to be received against the inner side of the curved portion of the flanges of the remaining member, this cushion strip thus forming a protecting covering which is disposed between the tire and the shoe. It is also preferable that a cushion strip 24 be mounted on the strap 18 to bear against the inner surface of the felly and thus injury to the tread of the tire or scratching of the paint on the wheel will be precluded.

It is my intention that this tire shoe shall be used more particularly as an emergency shoe to be fitted in place after the wheel has been stalled and under circumstances where it would be impossible to fit the usual roughening chains, however by making the arms 11 and 12 of slightly less transverse extent the structure could be adapted to be fitted in place and used during constant running of the vehicle and to take the place of the usual chains.

From the foregoing it will be seen that the invention provides a shoe which may be readily fitted in place from the running board or step of the vehicle to which the tire is fitted, and which is provided with a securing means which may be readily actuated with one hand to either lock or unlock the same.

While I have herein shown and described only one specific form of shoe and fastening means, it will be understood that slight variations might be resorted to in the several parts without departing from the spirit and scope of my invention and hence I do not wish to be limited to the exact showing except for such limitations as may be imposed by the claims.

I claim:

1. A tire shoe comprising a pair of members each of which is provided with a tire engaging portion and with an extension, said members adapted to be fitted with the extensions in overlapped relation, means by which the members are adjustably connected together through the medium of the extensions and may thus be set to have the tire engaging portions thereof fit over and embrace tires of various sizes, and means to secure the members against displacement from the fitted position.

2. A tire shoe comprising a pair of members each of which is provided with a tire engaging portion and with an extension, said members adapted to be fitted with the extensions in overlapped relation, means by which the members are adjustably connected together through the medium of the extensions and may thus be set to have the tire engaging portions thereof fit over and embrace tires of different sizes, and means adjustably connected with said members to be received over the felly of the wheel on which the tire is mounted to secure the members against displacement, the adjustable connection of the last mentioned means allowing fitting and securement of the device upon tires of different sizes.

3. A tire shoe comprising a pair of duplicate substantially L-shaped members provided with openings through certain of the arms thereof and with these arms mounted in overlapped relation, means to be received through the openings of the overlapped arms to rigidly connect the members together to take a substantially U-shaped form and the parts being thus mounted to be adjustable for reception upon various sizes of tires, and means to secure the shoe in place.

4. A tire shoe comprising a pair of substantially L-shaped members adjustably connected together to take a substantially U-shaped form and to permit variation of the spacing between the parallel arms, the free arm of each of the members provided with spaced apart openings, and means connected in the openings of said free arms to draw across the felly of the wheel to secure the shoe in place and to be adjustable to accommodate the varying spacing of the arms of the members.

In testimony whereof I affix my signature in presence of two witnesses.

DANIEL R. THOMAS.

Witnesses:
G. E. THORPE,
L. A. PELKY.